United States Patent
Urai (10) Patent No.: US 9,550,693 B2
(45) Date of Patent: Jan. 24, 2017

(54) METHOD FOR MANUFACTURING OPTICAL ELEMENT

(71) Applicant: CANON KABUSHIKI KAISHA, Tokyo (JP)

(72) Inventor: Shigeo Urai, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 13/910,920

(22) Filed: Jun. 5, 2013

(65) Prior Publication Data
US 2013/0327094 A1 Dec. 12, 2013

(30) Foreign Application Priority Data

Jun. 7, 2012 (JP) .................................. 2012-130082

(51) Int. Cl.
*C03B 11/12* (2006.01)
*C03B 11/16* (2006.01)

(52) U.S. Cl.
CPC ............ *C03B 11/122* (2013.01); *C03B 11/125* (2013.01); *C03B 11/16* (2013.01); *C03B 2215/69* (2013.01); *C03B 2215/72* (2013.01)

(58) Field of Classification Search
CPC ...... C03B 11/122; C03B 11/125; C03B 11/16; C03B 2215/72; C03B 2215/69
See application file for complete search history.

(56) References Cited

U.S. PATENT DOCUMENTS

| 6,629,435 | B2 * | 10/2003 | Tomisaka ........................ 65/102 |
| 7,336,424 | B2 * | 2/2008 | Yoneda ........................ 359/642 |
| 7,930,901 | B2 | 4/2011 | Fujiwara et al. |
| 2005/0011227 | A1 * | 1/2005 | Sakai et al. .................. 65/29.21 |
| 2005/0054511 | A1 * | 3/2005 | Fujiwara et al. ............... 501/45 |
| 2010/0004112 | A1 * | 1/2010 | Ohkawa et al. ................ 501/42 |

FOREIGN PATENT DOCUMENTS

JP 2004-107145 A 4/2004

OTHER PUBLICATIONS

Kazuo Tachiwana, "Optical Glass", Glass Engineering Handbook, first edition, pp. 525-539, ISBN: 4-254-25238-2 (1999).

* cited by examiner

*Primary Examiner* — Queenie Dehghan
(74) *Attorney, Agent, or Firm* — Canon U.S.A. Inc., IP Division (57) ABSTRACT

A method for manufacturing an optical element includes pressing a phosphate-based glass containing $Bi_2O_3$ in a proportion of 10 mass % or higher and 30 mass % or lower with a hot mold; and then cooling the same, in which pressure equal to or higher than the critical pressure of oxygen and equal to or lower than a strength of glass is continuously applied to the glass from the time of bringing the glass into contact with the pressing surface of the mold at a glass viscosity of log η=9 [dPa·sec] or higher and 10 [dPa·sec] or lower until the glass viscosity log η increases to 12 [dPa·sec] by cooling.

4 Claims, 4 Drawing Sheets

PRESSURIZATION

FIG. 1C

PRESSURE HOLDING
(PRESSURE REDUCTION)

FIG. 1D

PRESSURIZATION
(PRESSURE INCREASE)

METHOD FOR MANUFACTURING OPTICAL ELEMENT

BACKGROUND OF THE INVENTION

Field of the Invention

The present invention relates to a method for manufacturing an optical element and particularly relates to a method for manufacturing an optical element for use in an optical apparatus, such as cameras and videos, by press-molding.

Description of the Related Art

Heretofore, a method for obtaining an optical element by press-molding glass which is heated and softened is known. However, in recent years, a technique of molding a glass material having a special optical constant has been required with an enhancement of performance of a lens unit.

The composition of the glass material of a special optical constant sometimes become a thermally unstable composition. When the glass material of the composition is heated to a molding temperature, the generation amount of volatile constituents increases. When a lens is hot-molded using such a glass material, a foggy lens in which air bubbles are generated due to the generation of volatile constituents is molded, so that the appearance becomes poor. Therefore, when molding the glass material of a special optical constant, a technique of suppressing the generation of volatile constituents is required.

As a former technique of suppressing the generation of volatile constituents, a method for pressurizing the atmosphere in a chamber to be equal to or higher than the vapor pressure is disclosed (Japanese Patent Laid-Open No. 2004-107145).

However, in the former technique described in Japanese Patent Laid-Open No. 2004-107145, the pressure from the atmosphere does not act on the surface where a mold and glass contact each other, and the pressurization force to the glass decreases, so that air bubbles due to volatilization are generated in the molded surface. Furthermore, although the standard of "equal to or higher than the vapor pressure" is described, the material of a special optical constant, particularly a phosphate-based glass containing $Bi_2O_3$ in a proportion of 10 mass % or higher and 30 mass % or lower, has had a problem to be solved such that the effect of suppressing volatilization is not obtained even when pressurization exceeding the vapor pressure of metallic elements is performed.

SUMMARY OF THE INVENTION

The present invention provides a method for manufacturing an optical element whose pressed surface is good even when hot press-molding is performed using a phosphate-based glass material.

The method for manufacturing an optical element which solves the above-described problems includes, in a method for manufacturing an optical element by pressing a phosphate-based glass containing $Bi_2O_3$ in a proportion of 10 mass % or higher and 30 mass % or lower with a hot mold, and then cooling the same, continuously applying pressure equal to or higher than the critical pressure of oxygen and equal to or lower than a strength of glass to the glass from the time of bringing the glass into contact with a pressing surface of the mold at a glass viscosity of log η=9 [dPa·sec] or higher and 10 [dPa·sec] or lower until the glass viscosity log η increases to 12 [dPa·sec] by cooling.

The present invention can provide a method for manufacturing an optical element whose pressed surface is good even when hot press-molding is performed using a phosphate-based glass material.

Further features of the present invention will become apparent from the following description of exemplary embodiments with reference to the attached drawings.

DESCRIPTION OF THE EMBODIMENTS

A method for manufacturing an optical element of the invention includes, in a method for manufacturing an optical element by pressing a phosphate-based glass containing $Bi_2O_3$ in a proportion of 10 mass % or higher and 30 mass % or lower with a hot mold, and then cooling the same, continuously applying pressure equal to or higher than the critical pressure of oxygen and equal to or lower than the strength of glass to the glass from the time of bringing the glass into contact with a pressing surface of the mold at a glass viscosity of log η=9 [dPa·sec] or higher and 10 [dPa·sec] or lower until the glass viscosity log η increases to 12 [dPa·sec] by cooling.

It is suitable that pressure equal to or higher than the critical pressure of oxygen and equal to or lower than the strength of glass is continuously applied to the glass from the time bringing the glass into contact with the pressing surface of the mold, and then heating to adjust the glass viscosity to log η=9 [dPa·sec] or higher and 10 [dPa·sec] or lower until, after pressing, the glass viscosity log η increases to 12 [dPa·sec] by cooling.

Figure 1A:
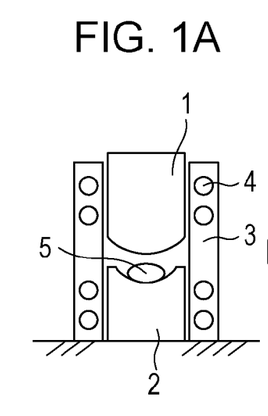
FIGS. 1A to 1E are flowcharts illustrating one embodiment of a method for manufacturing an optical element of the invention.
Figure 1B:
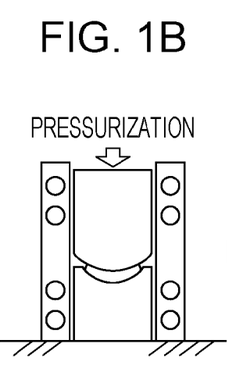
Figure 1C:
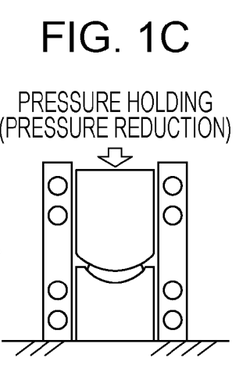
Figure 1D:
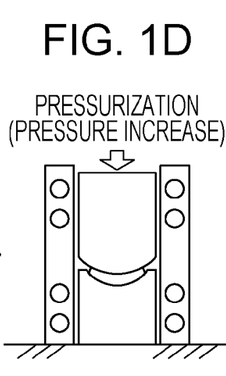
Figure 1E:
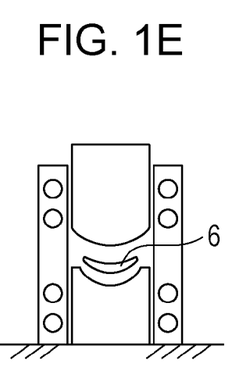

Hereinafter, a first embodiment of the invention is specifically described with reference to the drawings. FIGS. 1A to 1E are flowcharts illustrating one embodiment of the method for manufacturing an optical element of the invention. The molding process proceeds in the order of FIGS. 1A to 1E. The state of the mold and the glass in each molding process is illustrated in a schematic view. FIG. 1A illustrates a heating process, FIG. 1B illustrates an upper mold pressing process, FIG. 1C illustrates a pressure holding process, FIG. 1D illustrates a cooling and pressing process, and FIG. 1E illustrates an extraction process. The figures include an upper mold 1, a lower mold 2, a blow mold 3, heaters 4 for heating a mold and a glass preform, a glass preform 5, and a molded glass lens 6. Although not illustrated, a press member, such as an electric servo, which can apply a pressing load to a mold, is connected to the upper mold.

The material of the glass preform denoted by 5 is a phosphate-based glass containing $Bi_2O_3$ in a proportion of 10 mass % or higher and 30 mass % or lower. The Tg (glass transition point) of the phosphate-based glass is 454° C. or higher and 483° C. or lower.

Figure 2:
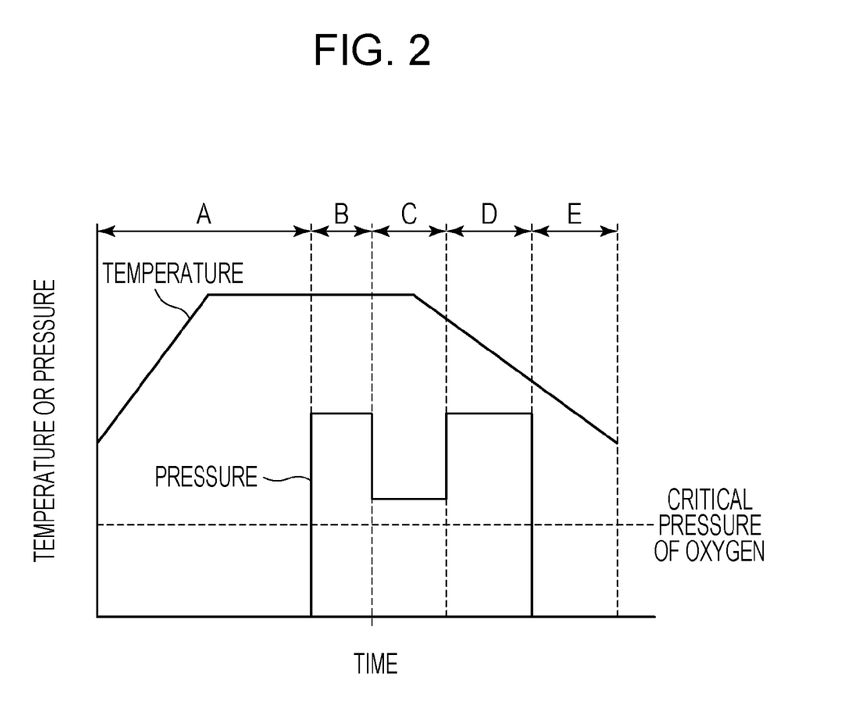
FIG. 2 is a molding process diagram relating to the method for manufacturing an optical element of FIG. 1.

FIG. 2 is a molding process diagram relating to the method for manufacturing an optical element of FIGS. 1A to 1E. The molding process includes the following five processes corresponding to those of FIGS. 1A to 1E. A of FIG. 2 corresponds to the heating process, B of FIG. 2 corresponds to the upper mold pressing process, C of FIG. 2 corresponds to the pressure holding process, D of FIG. 2 corresponds to the cooling and pressing process, and E of FIG. 2 corresponds to the extraction process.

The explanation of each process is described below.

In the heating process of A of FIG. 2, the glass preform (hereinafter also referred to as glass) 5 is placed in the lower mold 2, and then the mold is heated with heaters to a temperature at which the glass viscosity decreases to log $\eta=9$ [dPa·sec] or higher and 10 (dPa·sec) or lower. The heating temperature of the heating process is suitably in the range of 510° C. or higher and 545° C. or lower. When the viscosity is extremely reduced to be lower than log $\eta=9$ [dPa·sec], volatilization increases, so that the glass becomes fogging due to the volatilization caused by heating before pressing, resulting in the fact that the appearance is poor. On the other hand, when the viscosity becomes higher than log $\eta=10$ [dPa·sec], the glass is deformed to a predetermined thickness at a high pressure, so that cracking occurs, which results in the fact that the glass is broken. Or, even when the glass can be molded at a pressure at which the glass is not broken, the time required for obtaining a predetermined deformation amount is prolonged, which results in the fact that the economical efficiency is impaired.

The value of the glass viscosity in the invention is a measured value obtained by penetration type viscosity measurement in the viscosity range of log $\eta=7.5$ [dPa·sec] or higher and 10 [dPa·sec] or lower or a measured value obtained by a beam bending method in the viscosity range of log $\eta=11$ [dPa·sec] or higher and 14 [dPa·sec] or lower.

In the pressing process of B of FIG. 2, pressure is applied to the upper mold 1 to press the glass to transfer the form of the upper and lower molds to the glass. In this case, pressure equal to or higher than the critical pressure of oxygen and equal to or lower than the strength of glass is applied to the glass. Suitably, when the pressure value is adjusted in the range of 10 MPa or higher and 100 MPa or lower, the press time is relatively short, so that the breakage of the glass can be suppressed. Thus, the pressure value is suitable. In the pressure holding process of C of FIG. 2, the pressure to the glass is reduced in such a manner that the stress in the glass before cooling becomes small in order to increase the surface accuracy, but the pressure holding remains. The pressure holding value is a pressure value of 5.05 MPa, which is the critical pressure of oxygen, or higher and 100 MPa or higher and 300 MPa or lower, which is the strength of glass. The strength of glass shows the pressure at which cracking occurs and the glass is broken. In order to control the change amount of the center thickness of the lens during the pressure holding as small as possible to facilitate the control of the center thickness, the pressure holding value is in the range of 5.05 MPa, which is the critical pressure of oxygen, or higher to 10 MPa which is about twice the critical pressure. In this case, a portion where the pressure is the minimum pressure in the pressing surface to be equal to or higher than the critical pressure of oxygen considering the pressure distribution due to the lens form and the temperature distribution. The pressure distribution occurs mainly due to a difference in the thickness of the lens in many cases. A portion where the thickness is the largest shows the minimum pressure value. The pressing pressure value may be adjusted in such a manner that the pressure of the largest thickness portion is equal to or higher than the critical pressure of oxygen. When molding under an environment of complicated lens form and temperature distribution, the pressure value may be determined by initially evaluating the pressure distribution by numerical analysis, such as FEM (finite element method).

In the middle of the pressure holding process of C of FIG. 2, a reduction in the mold temperature is started. Thus, the glass viscosity becomes higher but at least the pressure holding equal to or higher than the critical pressure of oxygen is continuously applied until the glass viscosity reaches log $\eta=12$ [dPa·sec]. In this case, although the pressure distribution in the pressing surface changes due to thermal shrinkage, the pressure holding value may be set in such a manner that the pressure of the portion where pressure is the minimum is equal to or higher than the critical pressure of oxygen.

In the cooling and pressing process of D of FIG. 2, the pressure to the glass is increased again in order to increase the surface accuracy. The pressure range is set in a pressure range in which the deformation amount larger than the sink amount to be generated due to the thermal shrinkage of the glass is obtained. The pressure range is suitably set in a pressure range of 50 MPa or higher and 100 MPa or lower. When abnormalities do not arise in the surface accuracy, only cooling may be continued without increasing the pressure.

In the extraction process of E of FIG. 2, the application of the pressure to the glass is released, the mold is opened, and then the molded lens is extracted from the mold. The extracted lens is evaluated for the appearance quality, such as fogging and air bubbles, by a visual inspection under an optical microscope. Moreover, the form quality of an optical element is evaluated by variation measurement of the center thickness with a height gauge.

The appearance of the lens obtained through the processes described above is good. This is considered to be because, when the pressure equal to or higher than the critical pressure is applied to oxygen which forms a covalent bond with Bi which is an easily-volatilizable component, $Bi_2O_3$ is not decomposed into Bi and O, and the bond can be maintained. By this action, the deposition of Bi onto the front surface of the pressed surface or the generation of air bubbles by oxygen in the glass surface can be prevented.

The method for manufacturing an optical element of the invention is suitably used for a method for manufacturing an optical element using a phosphate-based glass containing $Bi_2O_3$ in a proportion of 10 mass % or higher and 30 mass % or lower and suitably 20 mass % or higher and 30 mass % or lower as the material. Even when the glass containing $Bi_2O_3$ in a proportion of 10 mass % or higher and 30 mass % or lower is hot press-molded, air bubbles or the like due to volatilization are not formed in the pressed surface, so that a lens excellent in the appearance quality can be molded. In glass containing $Bi_2O_3$ in a proportion lower than 10 mass %, the generation amount of volatile constituents from the glass is small, so that the appearance quality is good, even when the molding is not performed under the molding process conditions of the invention. In glass containing $Bi_2O_3$ in a proportion higher than 30 mass %, the generation amount of volatile constituents in the heating process is large, so that the appearance quality does not become good even when the molding is performed under the molding process conditions of the invention.

Next, a second embodiment of the invention is specifically described with reference to the drawings. In contrast to the first embodiment in which molding is performed by up-and-down operation of only the upper mold, a method for certainly continuously applying a predetermined pressure to glass while controlling the pressure and the temperature of upper and lower molds by a molding machine having upper and lower biaxial press shaft is described in the second embodiment.

Figure 3A:
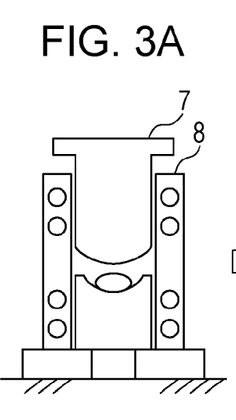
FIGS. 3A to 3F are flowcharts illustrating another embodiment of the method for manufacturing an optical element of the invention.
Figure 3B:
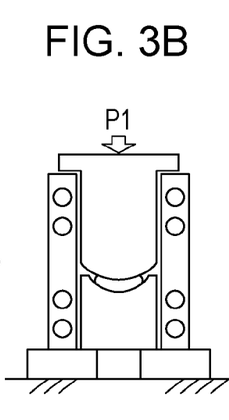
Figure 3C:
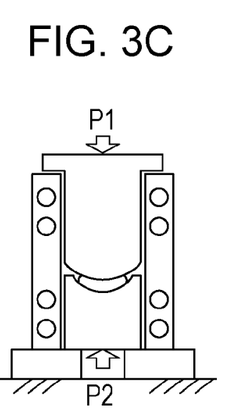
Figure 3D:
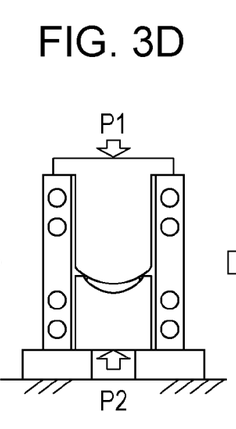
Figure 3E:
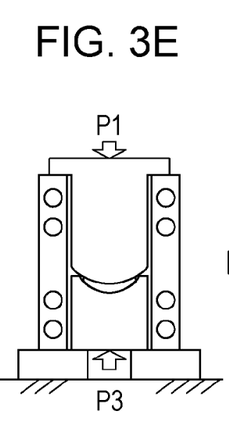
Figure 3F:
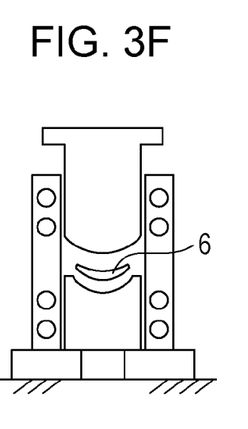

FIGS. 3A to 3F are flowcharts illustrating another embodiment of the method for manufacturing an optical element of the invention. The molding process proceeds in the order of FIGS. 3A to 3F. The state of the mold and the glass in each molding process is illustrated in a schematic view. FIG. 3A illustrates a heating process, FIG. 3B illustrates an upper mold pressing process, FIG. 3C illustrates a lower mold pressure holding process, FIG. 3D illustrates an upper mold/blow mold striking process, FIG. 3E illustrates a lower mold cooling and pressing process, and FIG. 3F illustrates a lens extraction process. FIG. 3 includes an upper mold flange surface 3 and a blow mold upper surface 8. It is configured so that the surfaces 7 and 8 are struck to each other in the process of FIG. 3D due to a load P1 in the figures, and the center thickness of a lens can be controlled with high precision.

Figure 4:
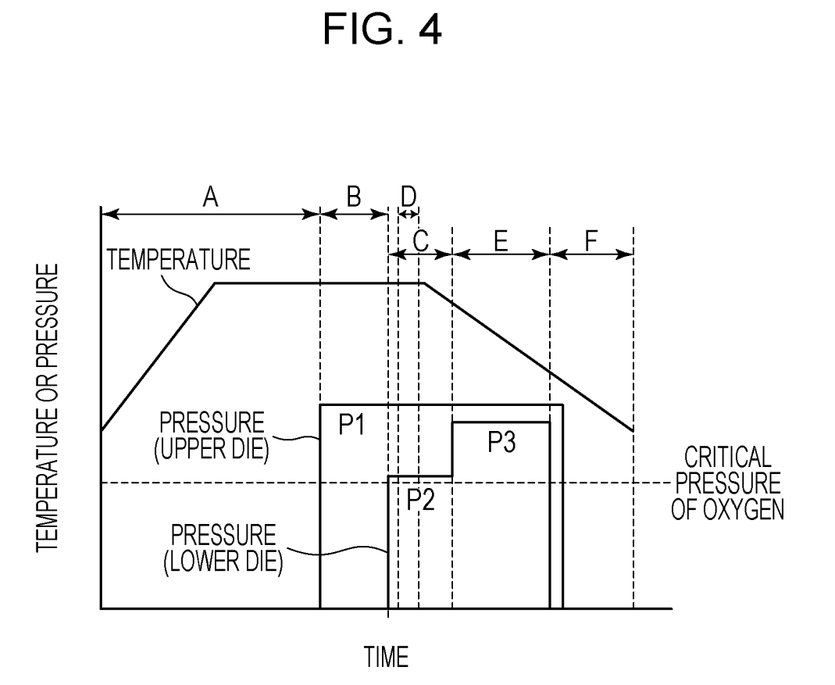
FIG. 4 is a molding process diagram relating to the method for manufacturing an optical element of FIG. 3.

FIG. 4 is a molding process diagram corresponding to each molding process of FIGS. 3A to 3F. A of FIG. 4 corresponds to the heating process, B of FIG. 4 corresponds to the upper mold pressing process, C of FIG. 4 corresponds to the lower mold pressure holding process, D of FIG. 4 corresponds to the upper mold/blow mold striking process, E of FIG. 4 corresponds to the lower mold cooling and pressing process, and F of FIG. 4 corresponds to the lens extraction process.

The explanation of each process is described below.

In the heating process of A of FIG. 4, heating is performed with heaters embedded in the mold in such a manner that the glass viscosity reaches log η=9 [dPa·sec] or higher and 10 [dPa·sec] or lower. In this case, in the case where the viscosity is excessively reduced to log η=9 [dPa·sec], when the critical pressure of oxygen is applied to the glass in the following lower mold pressure holding process of C of FIG. 4, the deformation rate in the press shaft direction of the mold becomes high, so that the control of the center thickness becomes difficult. Therefore, the viscosity is adjusted in such a manner that the change rate of the center thickness is 1 μm/sec or lower when the critical pressure of oxygen is applied. Furthermore, it is suitable to form the mold into an airtight type structure or to form the mold to have a narrow portion where the channel of the glass becomes narrower from the center to the periphery, in such a manner that the change rate of the center thickness becomes low even when a high pressure is applied to the glass. Such adjustment of the change rate of the center thickness is performed in preliminary molding. The heating temperature of the heating process is suitably in the range of 510° C. or higher and 545° C. or lower.

In the upper mold pressing process of B of FIG. 4, the load P1 is applied to the mold to pressurize the glass to transfer the shape of the mold to the glass. The pressure to be applied to the glass is set to be higher than the critical pressure of oxygen and lower than pressure at which the glass is broken, in order to increase the deformation rate of the glass. Specifically, it is suitable that the pressure acting on the glass is set to a pressure value slightly smaller than the threshold pressure at which the glass is broken, from 100 MPa to 300 MPa, and the cycle time is shortened.

In the lower mold pressure holding process of C of FIG. 4, a load value at which pressure from 5.05 MPa which is the critical pressure of oxygen to 10 MPa which is about twice the pressure is applied to the glass is applied to the mold at a pressure P2 of the figures. The mold is prevented from being lifted upward by adjusting the pressure in such a manner as to satisfy P1>P2. In this state, the pressure generated by the load P1 instead the load P2 is applied to the glass.

In the upper mold/blow mold striking process of D of FIG. 4, the upper mold flange surface of 7 and the blow mold upper surface 8 are struck to each other. In this case, the load P1 is gradually accepted by the blow mold, and the pressure to the glass shifts from the pressure generated by the load P1 o the pressure generated by the load P2. This is because the P1 acts on the blow mold by the striking and the stress generated in the glass due to the load P1 decreases due to stress relaxation, so that only the pressure generated by the load P2 acts on the glass.

On the other hand, as a comparison, when the conditions are changed to conditions where the load P2 is not made to act on the mold in the process C, the load P1 does not act on the glass by the striking, so that the pressure in the glass becomes almost 0 with time. In this case, since a large amount of easily-volatilizable components are generated, so that the appearance of a lens becomes poor. Therefore, the timing at which the load P2 is applied to the glass is required to be set before the striking.

The necessary time until the stress in the glass by P1 becomes 0 can be calculated by comparing with the thickness of a molded article in which the molding temperature is sufficiently increased and the position coordinate of the upper mold positioned by the striking. This adjusts the timing at which cooling is started in the following process. The stress in the glass by P1 is made as small as possible when starting the cooling, whereby the surface accuracy can be stabilized.

In the lower mold cooling and pressing process of E of FIG. 4, the cooling of the glass is further advanced. The cooling is performed at a glass viscosity of log η=11 [dPa·sec] or higher and 15 [dPa·sec] or lower, and the glass is pressurized again at a load P3 which is lower than P and higher than P2. When there is no problem in the surface accuracy, the load P3 may be made lower than P2. However, at least the load P2 is continuously applied to the glass until the glass viscosity reaches log η=12 [dPa·sec], and then the load P3 is applied.

In the lens extraction process of F of FIG. 4, the pressure to the mold is released to open the mold, and then the molded lens is extracted from the mold.

The extracted lens is evaluated for the appearance quality, such as fogging and air bubbles, by a visual inspection under an optical microscope. Moreover, the form quality is evaluated by variation measurement of the center thickness with a height gauge. In the lens obtained through the above-described molding processes, poor appearance is not observed and, in spite of the fact that the pressure is continuously applied to the glass, the variation in the center thickness can be controlled to ±10 μm or lower.

The manufacturing method of the invention can be used for manufacturing of optical elements, such as a lens and a prism, for example.

EXAMPLES

Example 1

In this example, molding was performed under various kinds of conditions described below, and the appearance quality of lenses was confirmed. The molding method is based on the processes of FIGS. 1A to 1E described in the first embodiment of the invention.

First, the conditions of glass materials for use in molding are described. As glass materials, five kinds of glass materials of A-1, A-2, A-3, B-1, and B-2 were prepared. All the glasses are phosphate-based glasses, the content of $Bi_2O_3$ which is an easily-volatilizable component is 5, 10, 20, 30, and 40 mass % in A-1, A-2, A-3, B-1, and B-2, respectively. The composition ratio of each of the glass materials of A-1, A-2, A-3, B-1, and B-2 is shown in Table 1.

TABLE 1

| Glass material | Composition ratio (mass %) | | | | | | | | | | | | |
| --- | --- | --- | --- | --- | --- | --- | --- | --- | --- | --- | --- | --- | --- |
| | $Bi_2O_3$ | $P_2O_5$ | $SiO_2$ | $B_2O_3$ | $Na_2O$ | $K_2O$ | $Li_2O$ | BaO | ZnO | $TiO_3$ | $Nb_2O_5$ | $Sb_2O_3$ | $WO_3$ |
| A-1 | 5 | 26.1 | 0.7 | 3.1 | 6.2 | 1.42 | 4.5 | 1.1 | 1.2 | 2.84 | 39.3 | 0 | 0 |
| A-2 | 10 | 26.1 | 0.7 | 3.1 | 6.2 | 1.42 | 4.5 | 1.1 | 1.2 | 2.84 | 34.3 | 0 | 0 |
| A-3 | 20 | 26.1 | 0.7 | 3.1 | 6.2 | 1.42 | 4.5 | 1.1 | 1.2 | 2.84 | 24.3 | 0 | 0 |
| B-1 | 30 | 21.1 | 0 | 0 | 3.42 | 1.1 | 2.5 | 0 | 0 | 0 | 27.4 | 0.1 | 10.7 |
| B-2 | 40 | 21.1 | 0 | 0 | 3.42 | 1.1 | 2.5 | 0 | 0 | 0 | 17.4 | 0.1 | 10.7 |

Next, molding process conditions are described.

In the heating process of FIG. 1A, the glass materials A-2, A-3, and B-1 were placed in a lower mold 2, and the mold was heated with heaters. In order to adjust the viscosity of each glass, the heating temperature in the heating process was set in a range of 500° C. or higher and 545° C. or lower. In the upper mold pressing process of FIG. 1B, the glass viscosity η during the upper mold press was changed in three stages. Specifically, the viscosities were log η=9.0, 9.5, and 10.0 [dPa·sec].

In the pressure holding process of FIG. 1C, the pressure value of pressure holding was changed in three stages including the critical pressure of oxygen. Specifically, the pressure values were 5.05 MPa (critical pressure of oxygen), 10.0 MPa, and 50.0 MPa. With respect to the glass viscosity η at which the pressure holding ended, the viscosities were changed in three stages, log η=12.0, 12.5, and 13.5 [dPa·sec].

In the cooling and pressing process of FIG. 1D, the pressure value of the cooling and pressing was changed in two stages, 0 and 100.0 MPa. The results of the appearance quality of the glass materials A-2, A-3, and B-1 are sequentially described below in each process.

Even when the glass viscosity η during the upper mold pressing in the upper mold pressing process of FIG. 1B was changed to log η=9.0, 9.5, and 10.0 [dPa·sec], poor appearance, such as fogging and cracking, did not occur.

It was able to be confirmed from these results that, under the conditions of log η=9.0 [dPa·sec] or higher and 10.0 [dPa·sec] or lower, the generation of fogging was suppressed, cracking did not occur, and press deformation was able to be performed to a predetermined thickness at a standard pressing pressure value of 50 MPa or higher and 100 MPa or lower. In the upper mold pressing process of FIG. 1B, pressure of a pressure value of 100 MPa was applied to the upper mold 1.

It was able to be confirmed that, also in the pressure holding process of FIG. 1C, when the pressure value of pressure holding was set to 5.05 MPa or higher and the glass viscosity at which the pressure holding ended was set to log η=12.0 [dPa·sec] or higher, an optical element with good appearance quality was obtained. In the cooling and pressing process of FIG. 1D, all the molding process conditions under which the appearance quality was good to the pressure holding process were not dependent on the cooling and pressing pressure value, and good appearance quality was maintained. It was able to be confirmed that, when the glass viscosity η was in a viscosity range of log η=12.0 [dPa·sec] or higher, the cooling and pressing pressure value of FIG. 1D did not affect the appearance quality.

Comparative Example 1

In this comparative example, the following conditions were changed from those of Example 1, and then molding was performed. Then, it was able to be confirmed whether or not the appearance quality deteriorated. In the upper mold pressing process of FIG. 1B, the glass viscosity η during the upper mold pressing was changed in two stages. Specifically, the viscosities were log η=8.5 and 10.5 [dPa·sec].

As a result, when the conditions were set in such a manner that the glass viscosity η during the upper mold pressing in the upper mold pressing process of FIG. 1B was log η=8.5 [dPa·sec], the volatilization amount was already large before press, and fogging generated in the glass surface. The fogging was not improved even when the molding conditions of the following process were changed to any conditions, so that the appearance quality was still poor. On the other hand, when the conditions were set to the condition of log η=10.5 [dPa·sec], the generation of fogging was suppressed. However, since the viscosity was extremely high, there arose a problem in which press deformation to a predetermined thickness was not able to be performed even when the load is gradually increased from 50 MPa or higher and 100 MPa or lower which is a standard pressing pressure value. When the load was increased to 200 MPa, cracking occurred, so that the glass was broken, which results in the fact that the following process was not able to be performed. In the upper mold pressing process of FIG. 1B, pressure of a pressure value of 100 MPa was applied to the upper mold 1.

Comparative Example 2

In this comparative example, the following conditions were changed from the conditions of Example 1 in which the appearance was good, and then molding was performed. Then, it was able to be confirmed whether or not the appearance quality deteriorated.

In the pressure holding process of FIG. 1C, the pressure value of pressure holding was changed in three stages. Specifically, the pressure values were 0.5 Pa, 2.5 MPa, and 200.0 MPa. 0.5 Pa set as the pressure value of pressure holding is a vapor pressure value when the temperature at which Bi which is an easily-volatilizable component is heated in molding is the highest.

As a result, in the pressure holding process of FIG. 1C, fogging generated when the pressure value of pressure holding was set to 0.5 Pa and 2.5 MPa. The appearance quality was not able to be satisfied even when the molding conditions of the following process were changed to any conditions. The generation of fogging was able to be suppressed under the conditions where the pressure value of pressure holding was 200.0 MPa. However, when the pressure value was set to 200 MPa, cracking occurred, so that the glass was broken, which results in the fact that the appearance quality became poor. It was able to be confirmed from these results that even when the vapor pressure value when the heating temperature in the molding of Bi was the highest was set as a standard value of pressure holding, the poor appearance was not able to be prevented. Furthermore, it was able to be confirmed that also when the pressure was set to be larger than the vapor pressure of Bi and lower than the critical pressure of oxygen, poor appearance occurred.

Comparative Example 3

In this comparative example, the glass viscosity η at which the pressure holding ended in the pressure holding process of FIG. 1C was changed to log η=11.5 [dPa·sec] from the conditions of Example 1 in which the appearance was good. Then, it was able to be confirmed whether or not the appearance quality deteriorated.

As a result, fogging generated, so that the appearance quality became poor. It was able to be confirmed that when the glass viscosity at which the pressure holding ended was made lower than log η=12.0 [dPa·sec], the appearance quality deteriorated.

Comparative Example 4

In this comparative example, the appearance quality of an optical element molded under the same molding process conditions as those of Example 1 using the glass material B-2 described in Example 1 was confirmed.

As a result, since $Bi_2O_3$ was contained in a proportion as high as 40 mass % in the glass material B-2, the generation amount of volatile constituents in the heating process of FIG. 1A is large, so that the appearance quality was not able to be satisfied under all the molding process conditions.

Reference Example 1

In this reference example, the appearance quality of an optical element molded under the same molding process conditions as those of Example 1 using the glass material A-1 described in Example 1 was confirmed.

As a result, since $Bi_2O_3$ was contained in a proportion of only 5 mass % in the glass material A-1, the generation amount of volatile constituents from the glass is small, so that the appearance quality was good under all the molding process conditions except the molding process conditions under which cracking occurs.

In the case of a phosphate-based glass containing $Bi_2O_3$ in a proportion lower than 10 mass %, the appearance quality was good even when molding was not performed under the molding process conditions of the invention.

Example 2

In this example, the pressure of each of P1 to P3 illustrated in FIGS. 3B to 3E was set in such a manner that the pressure profile acting on glass in the processes of FIGS. 3A to 3E described in the second embodiment of the invention was the same as that of Example 1. Specifically, the pressure applied to the glass in FIG. 1B corresponds to P1 and similarly the pressure of FIG. 1C corresponds to P2 and the pressure of FIG. 1D corresponds to P3. The lens had a convex meniscus shape with a diameter of 14 mm in which R of the convex surface was 21 mm, R of the concave surface was 14 mm, and the center thickness was 1.3 mm. As the material, the material B-1 described in Example 1 was used. The appearance quality and the center thickness accuracy of an optical element were confirmed under the above-described conditions.

As a result, with respect to the appearance quality, the same result as that of Example 1 was obtained. In the case where the pressure pattern applied to glass was the same, even when the structure was the upper and lower biaxial molding mold structure, good appearance quality was obtained.

On the other hand, with respect to the form quality, the center thickness accuracy improved under the conditions where the deformation rate of the lens was low in the lower mold pressure holding process of FIG. 3C, i.e., conditions where the glass viscosity when starting pressure holding was higher and the pressure value of pressure holding was lower. In the molding of the lens form of this example, in all the molding conditions where the appearance quality was good in which the glass viscosity when starting pressure holding was log η=9 [dPa·sec] or higher and 10 [dPa·sec] or lower and the pressure value of pressure holding was 5.05 MPa or higher and 50 MPa or lower, the deformation rate of the lens during pressure holding was able to be set to 1 μm/sec or lower.

In the case where the process for striking the upper mold and the blow mold was performed with the upper and lower biaxial molding mold structure and the lens deformation rate during pressure holding was set to 1 μm/sec or lower, even when the molding conditions were conditions where pressure was continuously applied, the center thickness accuracy was within ±10 μm, so that good form quality was obtained.

According to the manufacturing method of the invention, the pressed surface is good even when hot press-molding is performed using a phosphate-based glass material. Therefore, the manufacturing method of the invention can be used for methods for manufacturing optical elements, such as a lens and a prism.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-130082 filed Jun. 7, 2012, which is hereby incorporated by reference herein in its entirety.

What is claimed is:

1. A method for manufacturing an optical element, comprising:
    in a heating process, heating a phosphate-based glass containing $Bi_2O_3$ in a proportion of 10 mass % or higher and 30 mass % or lower to a first temperature, the first temperature ranging from a temperature at which the glass viscosity is log η=9 [dPa·sec] to a temperature at which the glass viscosity is 10 [dPa·sec],
    in a pressing process, pressing the heated glass with an upper mold and a lower mold at the glass viscosity of log η=9 [dPa·sec] to 10 [dPa·sec] at a first pressure, the first pressure being in the range of 10 MPa or higher and 100 MPa or lower,
    in a pressure holding process, holding the glass pressed in the pressing process with the upper mold and the lower mold at a second pressure, the pressure holding process comprising a first period where the second pressure is held at the first temperature and a second period where the second pressure is held while and cooling the glass to a second temperature, the second temperature ranging from a temperature that the heated glass is pressed at the viscosity of log η=9 [dPa·sec] in the pressing process to a temperature at which the glass viscosity is log η=12 [dPa·sec], in a cooling process, after the pressure holding process, cooling the pressed glass, and in an extracting process, extracting the cooled glass from the upper mold and the lower mold, wherein from a time of bringing the glass into contact with a pressing surface of the mold to a time of the glass reaching the second temperature, one of the first pressure and the second pressure is applied to the glass, and wherein the second pressure is equal to or higher than a critical pressure of oxygen and equal to or lower than 10 MPa.

2. The method for manufacturing an optical element according to claim 1, wherein in the pressing process, the heated glass is pressed with the upper mold and the lower mold by moving the upper mold, and wherein the cooling process following the pressure holding process further comprises pressing the glass with the upper mold and the lower mold by moving the lower mold to apply a third pressure in the range of 50 MPa or higher and 100 MPa or lower.

3. The method for manufacturing an optical element according to claim 1, wherein the change rate of center thickness of the glass is 1 μm/sec or lower when the pressure equal to or higher than the critical pressure of oxygen is applied.

4. The method for manufacturing an optical element according to claim 1, wherein the critical pressure of oxygen is 5.05 MPa.

* * * * *